APPARATUS FOR CONTROLLING THE SPEED OF A POWER DRIVEN VEHICLE

Filed March 21, 1932

Jacques François Felies
INVENTOR;
his Attorney.

Patented Dec. 19, 1933

1,940,081

UNITED STATES PATENT OFFICE 1,940,081

APPARATUS FOR CONTROLLING THE SPEED OF A POWER DRIVEN VEHICLE

Jacques François Felies, Antwerp, Belgium

Application March 21, 1932, Serial No. 600,092, and in the Netherlands March 26, 1931

4 Claims. (Cl. 137—144)

The invention relates to means for controlling the speed of a power driven vehicle and consists in the first place therein that an apparatus comprises at least two power fluid regulating members controllable by the same foot, of which one regulating member decreases the power fluid supply to the motor by increase of foot pressure and increases the supply by decrease of foot pressure, whereas another regulating member increases the power fluid supply by increase of foot pressure and decreases the supply by decrease of foot pressure.

Further according to the invention the controlling means of one or more regulating members may be arranged to control the clutch or foot brake.

The drawing shows an embodiment of the invention for controlling a motor vehicle.

Figure 1:
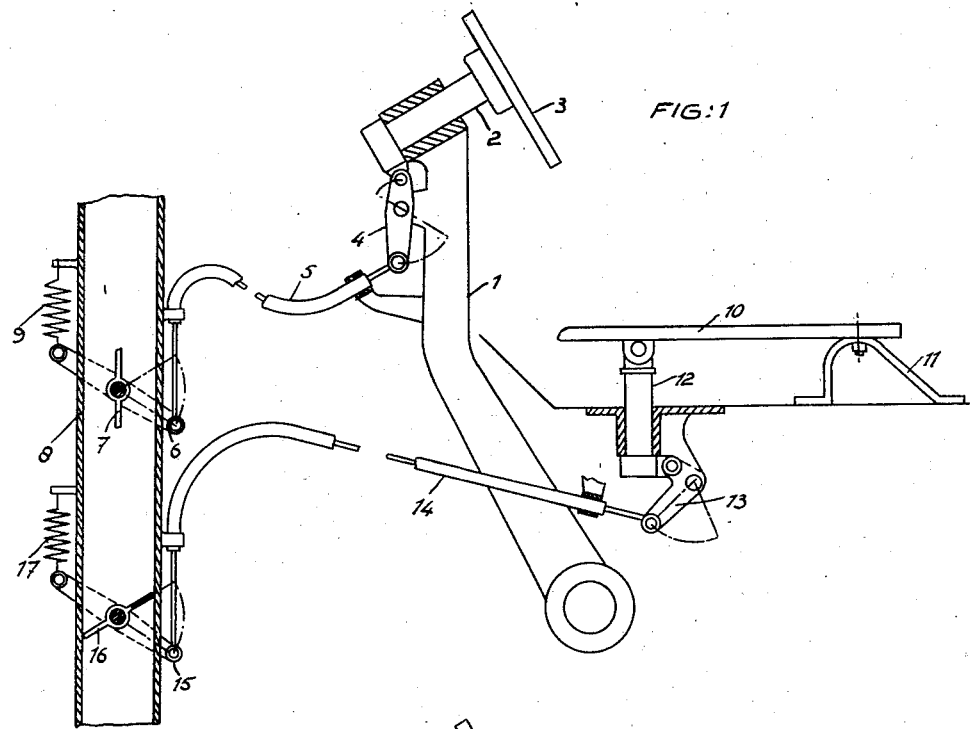
Fig. 1 shows the apparatus in its inactive position.
Figure 2:
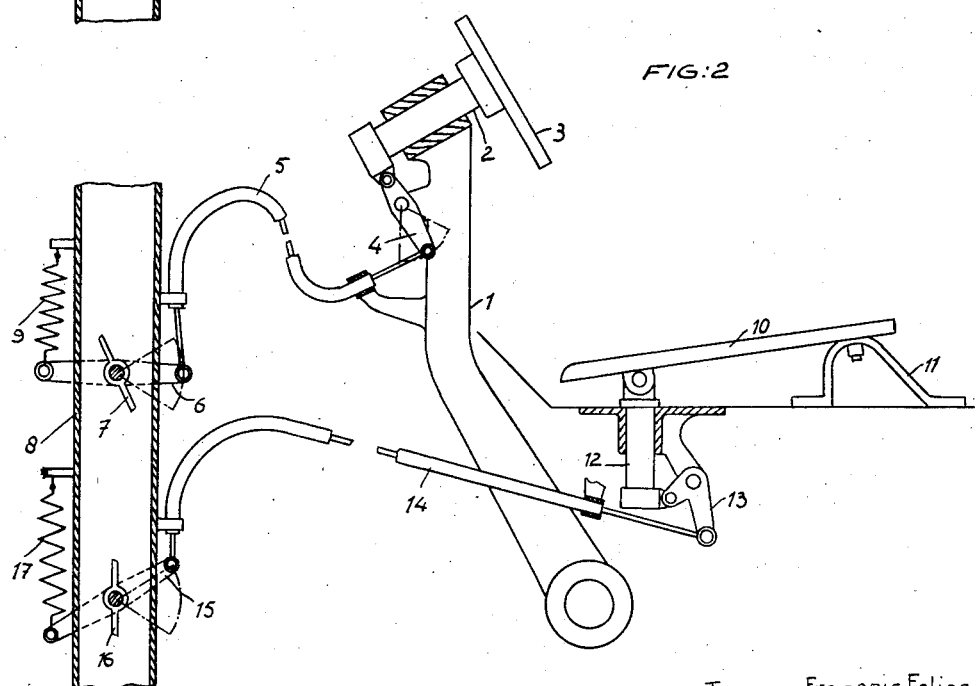
Fig. 2 shows the apparatus in its active position.

In the drawing, 1 is the foot pedal of the clutch or of the foot brake and 2 a slidable pin carrying the platform 3 for the right foot. 4 indicates a lever of which one arm is connected with the slidable pin 2 whilst to the other arm is fixed a Bowden cable 5 leading to a lever 6 of which the fulcrum forms at the same time the fulcrum of a throttle valve 7 in inlet tube 8. On the free end of the lever 6 operates a spring 9, which tends to keep the throttle valve open.

Further, 10 is a supporting platform for the rear portion of the foot, said platform being pivoted to a fixed bracket 11 whilst the platform at some distance from the opposite end is pivotally connected with a pin 12 slidable in a fixed guide. This pin 12 is also connected with a lever 13 transmitting the movement of the pin 12 by means of a Bowden cable 14 to a lever 15 of which the fulcrum passing through the inlet tube carries a second throttle valve 16. A spring 17 tends to close this throttle valve.

The apparatus is operated in the following manner:

First, the slidable pin 2 is pushed inwardly by means of the front portion of the right foot, so that the valve 7 against the action of the spring 9 is closed but for a small opening, the usual minimum supply opening. Thereafter the pin 12 is pushed inwardly by exerting pressure on the platform 10 with the rear portion of the same foot, so that the movement of this pin 12 by means of the lever 13 and the Bowden cable 14 is transmitted to the throttle valve 16 which, therefore, is fully opened against the action of the spring 17. This valve remains open as long as the rear portion of the foot keeps resting on the platform 10, so that the supply of power fluid to the motor may now be regulated by regulating the position of the valve 7 by means of the front portion of the foot resting on the platform 3. The valve 16, therefore, is normally kept open during driving with a view to having the fluid supply to the motor regulated by means of the regulating member 7.

If the pressure on the platform 3 is therefore gradually decreased the valve 7 gradually opens, or if the pressure on the platform 3 is gradually increased the valve 7 gradually closes. If the foot, therefore, is moved off from the platform 3 and from the platform 10, e. g. to leave the vehicle, the spring 17 moves the valve 16 into its position for minimum supply of power fluid to the motor and the spring 9 moves the valve 7 into fully open position.

What I claim is:

1. A speed control device for a motor vehicle including a fuel feed line, comprising in combination a normally open valve disposed in said feed line to control the fuel flow, a toe pedal operatively connected with said valve to regulate the same, a second normally closed valve disposed in the said feed line and a heel pedal operatively connected with the said second valve, said pedals being spaced apart to be operated by the same foot.

2. A device as claimed in claim 1, including resilient means tending to hold the said first valve in open position during rest position of the said first pedal, and further resilient means tending to hold the said second valve in closed position during rest position of the said second pedal, whereby foot pressure upon said first pedal tends to close the first valve and foot pressure upon said second pedal tends to open the second valve and vice versa, whereby the fuel supply to the motor is controlled.

3. A device as claimed in claim 1, which includes connecting means attached to one of said pedals and operatively connected to the brake of the vehicle to effect simultaneous reduction in the flow of fuel and braking of the vehicle, whereby a separate foot pedal is dispensed with.

4. In a motor vehicle, the combination of a motor, at least two power fluid control members for the motor, a pedal device, means operatively connecting one of said members with said pedal device, whereby by the pressure movement of a foot the said member which is normally in its maximum supply position is moved towards its closed position by increasing the foot pressure and towards its open position by decreasing the foot pressure, a second pedal device and means operatively connecting a second member with said second pedal device, whereby by the pressure of the same foot said second member which is normally in minimal supply position is moved into increased supply-position.

JACQUES FRANÇOIS FELIES.